US00RE38652E

(19) United States
(12) Reissued Patent
Provost

(10) Patent Number: US RE38,652 E
(45) Date of Reissued Patent: Nov. 16, 2004

(54) HOOK FOR HOOK AND LOOP FASTENERS

(75) Inventor: George A. Provost, Litchfield, NH (US)

(73) Assignee: Velcro Industries B.V., Curacao (AN)

(21) Appl. No.: 08/868,762

(22) Filed: Jun. 4, 1997

Related U.S. Patent Documents

Reissue of:
(64) Patent No.: 5,315,740
Issued: May 31, 1994
Appl. No.: 07/932,633
Filed: Aug. 20, 1992

(51) Int. Cl.[7] ..... A44B 18/00
(52) U.S. Cl. ..... 24/452
(58) Field of Search ..... 24/452, 442, 444, 24/446, 447, 448, 450, 306; 2/912; 128/DIG. 15

(56) References Cited

U.S. PATENT DOCUMENTS

| | | | | |
|---|---|---|---|---|
| 2,039,312 | A | 5/1936 | Goldman | 154/46 |
| 2,496,820 | A | 2/1950 | Smith | 155/184 |
| 2,625,161 | A | 1/1953 | Johnson | 128/290 |
| 2,717,437 | A | 9/1955 | Mestral | 28/72 |
| 2,991,843 | A | 7/1961 | Bell, Jr. | 183/51 |
| 3,005,219 | A | 10/1961 | Miller | 15/98 |
| 3,009,235 | A | 11/1961 | Mestral | 28/78 |
| 3,031,730 | A | 5/1962 | Morin | 24/204 |
| 3,080,688 | A | 3/1963 | Politzer | 51/185 |
| 3,083,737 | A | 4/1963 | Mestral | 139/16 |
| 3,085,309 | A | 4/1963 | Olson | 28/79 |
| 3,094,330 | A | 6/1963 | Smith | 273/54 |
| 3,138,841 | A | 6/1964 | Naimer | 24/204 |
| 3,147,528 | A | 9/1964 | Erb | 24/204 |
| 3,154,837 | A | 11/1964 | Mestral | 28/72 |
| 3,171,820 | A | 3/1965 | Volz | 260/2.5 |
| 3,176,364 | A | 4/1965 | Dritz | 24/213 |
| 3,214,323 | A | 10/1965 | Russell et al. | 161/148 |
| 3,226,751 | A | 1/1966 | Lemelson | 15/118 |
| 3,255,749 | A | 6/1966 | Smithers | 128/169 |
| 3,266,113 | A | 8/1966 | Flanagan, Jr. | 24/204 |
| 3,266,841 | A | 8/1966 | Altman | 297/220 |
| 3,277,547 | A | 10/1966 | Billarant | 24/204 |

(List continued on next page.)

FOREIGN PATENT DOCUMENTS

| | | |
|---|---|---|
| DE | 2929329 | 2/1981 |
| DE | 3533541 A | 4/1986 |
| DE | 3533881 | 4/1986 |
| EP | A2 0 276 970 | 8/1988 |
| EP | 0 289 198 A1 | 11/1988 |
| EP | 0 324 577 A1 | 7/1989 |
| EP | 0 325 473 A1 | 7/1989 |
| EP | 0 341 993 A1 | 11/1989 |
| EP | 0 353 972 A1 | 2/1990 |
| EP | A1 0 381 087 | 8/1990 |
| EP | 0 388 681 A2 | 9/1990 |
| EP | 0 409 315 A1 | 1/1991 |
| EP | 0 187 725 B1 | 3/1991 |
| FR | 2 432 108 | 3/1980 |
| FR | 2 586 558 | 3/1987 |
| GB | 1 140 576 | 1/1969 |
| GB | 1299 897 | 12/1972 |
| GB | 2 233 876 A | 1/1991 |
| JP | 51-14535 | 5/1976 |
| JP | 54-28369 | 3/1979 |
| JP | 55-137942 | 10/1980 |
| JP | 02-88015 | 3/1990 |
| TW | 34231 | 12/1980 |
| TW | 48288 | 1/1983 |
| WO | WO87/06522 | 11/1987 |
| WO | WO 94/23610 | 10/1994 |

*Primary Examiner*—Victor Sakran
(74) *Attorney, Agent, or Firm*—Fish & Richardson P.C.

(57) ABSTRACT

A plastic molded hook for use with a hook and loop fastening system especially adapted for use with low profile loops. The hook design includes a base, a stem and a crook whereby the volume of the portion of the hook penetrating into a pile of loops is defined as the displacement volume. Hooks especially adapted for use with low profile loops have a displacement volume of less than $6\times10^{-6}$ cubic inches.

21 Claims, 3 Drawing Sheets

U.S. PATENT DOCUMENTS

| | | | | |
|---|---|---|---|---|
| 3,302,232 | A | 2/1967 | Wasiloff et al. | 15/230.17 |
| 3,312,583 | A | 4/1967 | Rochlis | 161/62 |
| 3,319,307 | A | 5/1967 | Marforio | 24/204 |
| 3,327,708 | A | 6/1967 | Sokolowski | 128/156 |
| 3,405,430 | A | 10/1968 | Sidelman | 24/204 |
| 3,461,513 | A | 8/1969 | Girard et al. | 24/204 |
| 3,469,289 | A | 9/1969 | Whitacre | 24/205.17 |
| 3,484,330 | A | 12/1969 | Sokolowski et al. | 161/59 |
| 3,490,107 | A | 1/1970 | Brumlik | 24/204 |
| 3,494,006 | A | 2/1970 | Brumlik | 24/204 |
| 3,522,637 | A | 8/1970 | Brumlik | 24/204 |
| 3,536,518 | A | 10/1970 | Drelich | 117/38 |
| 3,546,754 | A | 12/1970 | Erb | 24/204 |
| 3,550,223 | A | 12/1970 | Erb | 24/204 |
| 3,550,837 | A | 12/1970 | Erb | 229/45 |
| 3,557,407 | A | 1/1971 | Lemelson | 18/10 |
| 3,562,044 | A | 2/1971 | Erb | 156/155 |
| 3,594,863 | A | 7/1971 | Erb | 18/5 |
| 3,594,865 | A | 7/1971 | Erb | 18/5 |
| 3,665,921 | A | 5/1972 | Stumpf | 128/287 |
| 3,665,922 | A | 5/1972 | Skora | 128/290 |
| 3,678,933 | A | 7/1972 | Moore et al. | 128/296 |
| 3,683,921 | A | 8/1972 | Brooks et al. | 128/296 |
| 3,694,867 | A | 10/1972 | Stumpf | 24/204 |
| 3,708,832 | A | 1/1973 | Erb | 161/48 |
| 3,708,833 | A | 1/1973 | Ribich et al. | 24/204 |
| 3,708,837 | A | 1/1973 | Chiba | 24/204 |
| 3,762,000 | A | 10/1973 | Menzin et al. | 24/204 |
| 3,768,479 | A | 10/1973 | Widlund | 128/287 |
| 3,770,359 | A | 11/1973 | Hamano | 425/305 |
| 3,863,304 | A | 2/1975 | Brumlik | 24/204 |
| 3,867,935 | A | 2/1975 | Elsdorfer et al. | 128/156 |
| 3,867,940 | A | 2/1975 | Mesek et al. | 128/287 |
| 3,895,797 | A | 7/1975 | Moore | 273/32 A |
| 3,905,071 | A | 9/1975 | Brumlik | 24/204 |
| 3,913,183 | A | 10/1975 | Brumlik | 24/204 |
| 3,943,981 | A | 3/1976 | De Brabander | 139/391 |
| 3,949,128 | A | 4/1976 | Ostermeier | 428/152 |
| 3,971,381 | A | 7/1976 | Gibson | 128/296 |
| 4,024,003 | A | 5/1977 | Bühler | 156/148 |
| 4,056,593 | A | 11/1977 | de Navas Albareda | 264/145 |
| 4,067,609 | A | 1/1978 | Ness | 297/220 |
| 4,082,886 | A | 4/1978 | Butterworth et al. | 428/284 |
| 4,162,344 | A | 7/1979 | Rones | 428/212 |
| 4,169,303 | A | 10/1979 | Lemelson | 24/204 |
| 4,216,257 | A | 8/1980 | Schams et al. | 428/93 |
| 4,290,174 | A | 9/1981 | Kalleberg | 24/204 |
| 4,290,194 | A | 9/1981 | Takahashi | 29/766 |
| 4,290,832 | A | 9/1981 | Kalleberg | 156/72 |
| 4,307,493 | A | 12/1981 | Ochiai | 24/204 |
| 4,330,907 | A | 5/1982 | Ochiai | 24/204 |
| 4,355,066 | A | 10/1982 | Newman | 428/198 |
| 4,374,888 | A | 2/1983 | Bornslaeger | 429/198 |
| 4,379,192 | A | 4/1983 | Wahlquist et al. | 428/156 |
| 4,402,690 | A | 9/1983 | Redfern | 604/391 |
| 4,454,183 | A | 6/1984 | Wollman | 428/100 |
| 4,463,486 | A | 8/1984 | Matsuda | 28/161 |
| 4,532,157 | A | 7/1985 | Schmidt et al. | 427/262 |
| 4,562,099 | A | 12/1985 | Hinchcliffe | 427/282 |
| 4,573,991 | A | 3/1986 | Pieniak et al. | 604/385 |
| 4,587,152 | A | 5/1986 | Gleichenhagen et al. | 428/195 |
| 4,596,568 | A | 6/1986 | Flug | 604/369 |
| 4,600,618 | A | 7/1986 | Raychok, Jr. et al. | 428/92 |
| 4,615,084 | A | 10/1986 | Erb | 24/442 |
| 4,654,246 | A | 3/1987 | Provost et al. | 428/88 |
| 4,672,893 | A | 6/1987 | Mammarella, Sr. | 101/170 |
| 4,695,500 | A | 9/1987 | Dyer et al. | 428/134 |
| 4,699,622 | A | 10/1987 | Toussant et al. | 604/389 |
| 4,707,893 | A | 11/1987 | Hashizume et al. | 24/446 |
| 4,725,221 | A | 2/1988 | Blanz | 425/575 |
| 4,725,473 | A | 2/1988 | Van Gompel et al. | 428/156 |
| 4,737,404 | A | 4/1988 | Jackson | 428/284 |
| 4,739,635 | A | 4/1988 | Conley et al. | 66/190 |
| 4,761,318 | A | 8/1988 | Ott et al. | 428/89 |
| 4,761,322 | A | 8/1988 | Raley | 428/156 |
| 4,794,028 | A | 12/1988 | Fischer | 428/100 |
| 4,834,738 | A | 5/1989 | Kielpikowski et al. | 604/385.2 |
| 4,846,815 | A | 7/1989 | Scripps | 604/391 |
| 4,854,984 | A | 8/1989 | Ball et al. | 156/73.5 |
| 4,861,399 | A | 8/1989 | Rajala et al. | 156/66 |
| 4,883,707 | A | 11/1989 | Newkirk | 428/219 |
| 4,894,060 | A | 1/1990 | Nestegard | 604/391 |
| 4,919,738 | A | 4/1990 | Ball et al. | 156/73.5 |
| 4,936,840 | A | 6/1990 | Proxmire | 604/385.2 |
| 4,959,265 | A | 9/1990 | Wood et al. | 428/343 |
| 4,963,140 | A | 10/1990 | Robertson et al. | 604/389 |
| 4,973,326 | A | 11/1990 | Wood et al. | 604/391 |
| 4,984,339 | A | 1/1991 | Provost et al. | 24/452 |
| 4,999,067 | A | 3/1991 | Erb et al. | 156/73.1 |
| 5,032,122 | A | 7/1991 | Noel et al. | 604/391 |
| 5,058,247 | A | 10/1991 | Thomas et al. | 24/448 |
| 5,067,210 | A | 11/1991 | Keyaki | 24/452 |
| 5,116,563 | A | 5/1992 | Thomas et al. | 264/167 |
| 5,119,643 | A | 6/1992 | Conley et al. | 66/190 |
| 5,158,819 | A | 10/1992 | Goodman, Jr. et al. | 428/131 |
| 5,180,534 | A | 1/1993 | Thomas et al. | 264/145 |
| 5,221,276 | A | 6/1993 | Battrell | 604/389 |
| 5,230,851 | A | 7/1993 | Thomas | 264/145 |
| 5,231,738 | A | 8/1993 | Higashinaka | 24/446 |
| 5,318,741 | A | 6/1994 | Thomas | 264/519 |
| 5,325,569 | A | 7/1994 | Goulait et al. | 24/448 |
| 5,326,415 | A | 7/1994 | Thomas et al. | 156/244 |
| 5,326,612 | A | 7/1994 | Goulait | 428/100 |
| 5,380,313 | A | 1/1995 | Goulait et al. | 604/391 |
| 5,385,706 | A | 1/1995 | Thomas | 264/519 |
| 5,392,498 | A | 2/1995 | Goulait et al. | 24/452 |
| 5,407,439 | A | 4/1995 | Goulait | 604/391 |
| 5,470,417 | A | 11/1995 | Goulait | 156/201 |
| 5,540,673 | A | 7/1996 | Thomas et al. | 604/391 |
| 5,569,233 | A | 10/1996 | Goulait | 604/391 |

HOOK FOR HOOK AND LOOP FASTENERS

Matter enclosed in heavy brackets [ ] appears in the original patent but forms no part of this reissue specification; matter printed in italics indicates the additions made by reissue.

BACKGROUND OF THE INVENTION

This invention relates to an improved hook for hook and loop fasteners and particularly to plastic molded hooks intended for use with low pile loops. The technology of hook and loop fasteners is well known wherein a fastener comprised of two separable pile fastening tapes have interengaging piles on their surfaces, one pile have loop-elements and the other hook elements, are capable of co-acting to form a separable bond.

Such pile fasteners have found a wide variety of uses where ease of opening and closing is desirable such as in clothing, footwear, home furnishings, medical products, automotive fastening and many other industrial situations where detachable or permanent engagement is required. U.S. Pat. No. 3,009,235, U.S. Pat. No. 3,083,737 and U.S. Pat. No. 3,154,837 disclose various forms of separable pile fastener tapes constructed from fibrous forms of synthetic polymers such as nylon using basic textile weaving techniques. Such methods create a base fabric into which is woven the pile surface capable of engaging to form the closure. In more recent times special hook materials have been made from plastic molding techniques wherein the hooks are integrally formed with a base strip as the tape is being formed.

U.S. Pat. No. 3,031,730 describes a closure wherein a surface of burr like elements are exposed on a surface to be positively coupled with a fabric. The burr like elements are in the form of cast or molded flexible or plastic hook like members.

U.S. Pat. No. 3,760,000 to Menzin discloses a hook "eye" having a sloping surface which functions as a cam surface for extracting the molded hook from its mold cavity. The shank surface has two flat sides of equal dimensions and a somewhat larger third side. The shank portion is larger in cross section nearer the web than at the tip of the hook and the three flat side portions of the shank are continuous in smooth curves into and throughout the hook portion with the shank portion of the three sides laying in the same continuous plane as the corresponding face of the hook portion. U.S. Pat. No. 3,312,583 to Rochlis and U.S. Pat. No. 3,708,833 to Ribich describe other embodiments of hooks having somewhat tapered shapes. U.S. Pat. No. 3,913,183 to Brumlik describes a self gripping device wherein the gripping elements are particularly adapted for self gripping fibers and the like along the entire length of the fibers.

U.S. Pat. No. 4,894,060 to Nestegard describes a hook design for a disposable diaper with an improved hook fastener portion wherein the hook is made by the technique of extruding a profile and subsequently slitting the profile to form discrete hooks. The Nestegard patent claims a hook of sufficiently small dimensions for engaging with low cost loops, particularly loops created by the nonwoven process. The hook shape of the Nestegard patent is considerably different than those of the instant invention because of the method of making the hooks wherein one is dependent upon a continuous profile prior to the cross cutting process. The dimensions disclosed and claimed in the Nestegard patent are not sufficient to calculate a displacement volume.

Even more recently U.S. Pat. No. 4,984,339 to the inventors of the instant application discloses an improved hook having a profile defined by an inner, smoothly contoured, generally concave face and an outer, generally convex face, wherein the hook tapers smoothly and continuously downward in width from a sturdy base member to its free end whereby the hook will not deform to release a loop engaging the hook in shear at or below the desired applied force.

While the hooks formed according to these patents posses many useful properties and engage with a wide range of loop constructions, they possess the limitations of many other prior art hooks in their inability to function effectively with very low profile loops constructed with very short individual loops. Such loops are especially desirable because of their thinness and their low cost. In some case such loops are laminated to thin layers of polyurethane foam to provide a resilient base so that hooks can more easily penetrate into the body of a pile and thus be more easily surrounded by loops. In general, however, such loops do not function well with conventional hook structures.

One exception to the above described phenomena is the so-called mushroom hook. Mushroom hooks are produced by a variety of processes. Details of these types of products are contained in U.S. Pat. Nos. 3,138,841, 3,770,359, 4,024,003 and 4,290,832. Generally, the steps include creating an upstanding filament of polypropylene monofilament and melting the top of the monofilament with heat which causes molten polymer to "melt back" or flow down the stem in a blob which solidifies at the terminal end of the filament to form a mushroom shape head on top of the stem. The mushroom head acts as do hooks of conventional hook and loop fasteners by entangling with loops to form a bond. Because of its small footprint, which will be discussed more fully below, mushroom fasteners are able to engage readily with lower pile loops than other hooks of the hook and loop type. However, mushroom products have many disadvantages. They are limited to use of orientated polypropylene fibers with associated limitations of that material, such as a relatively low temperature operating range. The mushroom heads are easily snapped off their stems giving such products very limited life in use, and the mushroom head does not have the flexing capability of a hook shape and therefore the only way a loop can be removed from the head is to rupture either the loop or the mushroom head. Other limitations of mushroom products are well known to those in the art.

SUMMARY OF THE INVENTION

The present invention contemplates producing a hook from the method described in U.S. Pat. No. 4,794,028 to Fischer in which both the size and shape of the hook is especially suited to low level loops. It has been found that outstanding and unexpected performance from such hooks in low level loops is possible. It is further realized that the selection of the appropriate resin greatly enhances the performance of such hooks. More specifically I have found that a hook produced with a displacement volume, discussed more fully below, of less than $6\times10^{-6}$ cubic inches and preferably a displacement volume of less than $4\times10^{-6}$ cubic inches will provide unusual and outstanding performance with a loop of the lowest loop configuration. Displacement volume, as defined herein, is the volume of a rectangular parallelepiped which delineate the volume of loop displaced when a hook penetrates into the loop to just the point where loops may start to fall into the cavity at the inside of the crook of a hook, as will be more fully appreciated from the description below.

BEST MODE FOR CARRYING OUT THE INVENTION

Figure 1:
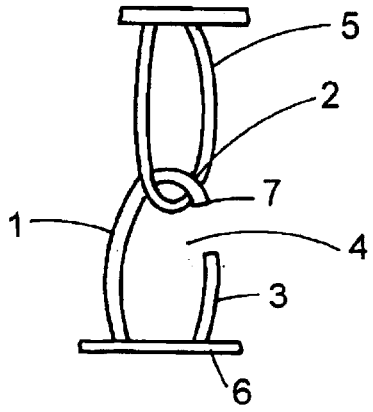
PRIOR ART FIG. 1
FIG. 1 is a cross section of a hook of a conventional textile hoop and loop closure system.
Figure 2:
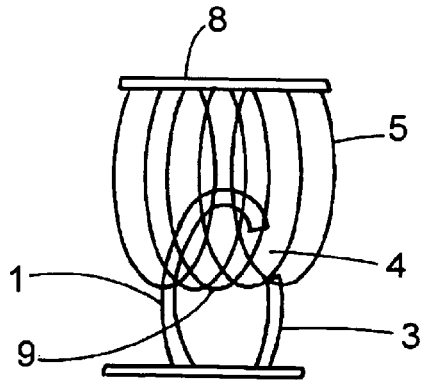
PRIOR ART FIG. 2
FIG. 2 depicts the hook of FIG. 1 as it would look engaging into a deep mat of loops in a standard loop strip of a hook and loop closure where the loop height is great relative to the return height of the crook.
Figure 6:
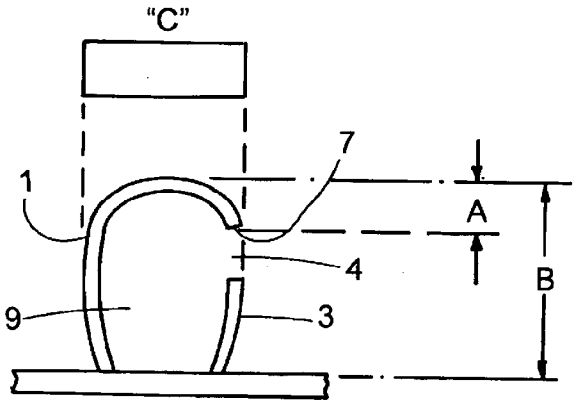
PRIOR ART FIG. 6
FIG. 6 depicts the hook of FIG. 1 showing the profile of displacement, or footprint, required when the hook penetrates into a mat of loops to a position equal the height of the loops.

Now referring to FIG. 1, a monofilament (1) strand is bent into a loop shape which is cut along one side of the loop to create the crook(2) of a hook with a residual portion(3) of the monofilament loop separated from the hook end tip(7) of the hook to provide a spaced opening(4) sufficient to permit loop(5) to enter and become entangled within the crook(2). In FIG. 6 the dimension "A" of the hook (1) represents the dimension of the return, or height of the crook, while "B" represents the total height of the hook from its base(6) to the top outside of the crook(2). The rectangle "C" of FIG. 6 represents the footprint of material that penetrates into a loop structure when penetration is just sufficient to position tip (7) below the top of a loop. FIG. 2 illustrates what happens when the hook(1) attempts to penetrate into a mat of loops. The top of the hook, having a footprint as shown in FIG. 6 "C", pushes aside the loops(5) and continues to penetrate into the loop pile until it strikes the base of the loop(8). The loops(5), being resilient, spring back and some of the loops enter the space(4) provided by cutting the monofilament. The crook of the hook ensnares the loop which is well within the interior space(9) formed by the monofilament. In this manner the loop becomes ensnared by the hook and when attempting to separate the hook from the loop, separation is restrained by the two components so engaged. To separate the components, the hook must be deflected or opened. While the force to open an individual hook is small, a proper hook and loop fastener has a sufficient number of hook encounters to require a substantial force to separate the strips.

Figure 3:
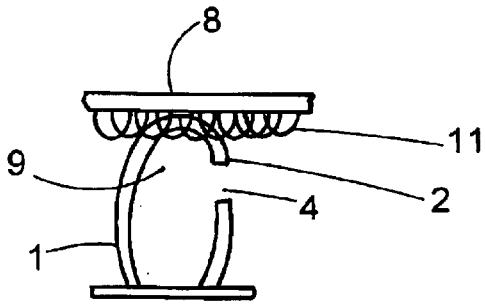
PRIOR ART FIG. 3
FIG. 3 depicts the hook of FIG. 1 engaging a low profile loop where the return of the crook is greater than the height of the loops.

FIG. 3 shows the same hook penetrating a loop strip which has short loops. The loop height(11) of the low pile type is less than the return of the crook of the hook, dimension "A" in FIG. 6. In such cases the loops are deflected as illustrated in FIG. 3 but the penetration of the hook is stopped when it strikes the base (8) of the loop strip. However, the loops are so short that, regardless of how resilient they may be and regardless of how well they spring back and attempt to enter the space(4) in the hook, their height is insufficient to permit such to take place. The loops are simply unable to get above or around the crook(2) of the hook (1). When this condition prevails there is little or no engagement between the hook and the loops.

Figure 4:
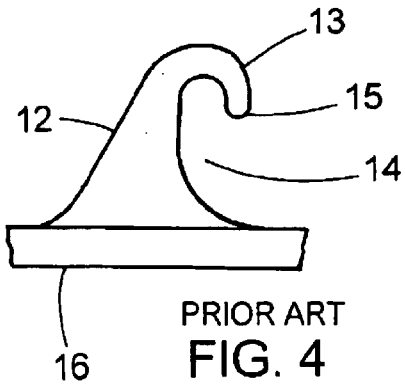
PRIOR ART FIG. 4
FIG. 4 is a cross section of a plastic molded hook as described in the prior art.
Figure 5:
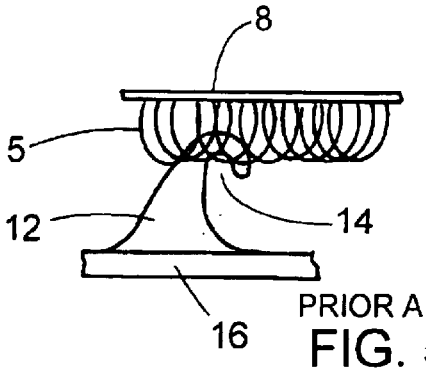
PRIOR ART FIG. 5
FIG. 5 depicts the hook of FIG. 4 as it would look engaging into a mat of loops in a standard loop element of a hook and loop closure where the hook is engaged with a single loop.

FIG. 4 shows a cross section of a plastic molded hook, formed by plastic molding techniques in desired shapes as disclosed in U.S. Pat. No. 4,984,339 assigned to the owner of the instant invention and incorporated by reference herein. In this instance the crook(13) is molded into a similar shape as the crook of the textile monofilament crook(2). However, there is no residual portion(3) to inhibit the movement of loop into and under the crook(13) thus providing a much greater opening (14) than is available from a monofilament textile hook. FIG. 5 is the hook of FIG. 4 engaged with a standard loop. The hook shown has all the features of the hook disclosed in U.S. Pat. No. 4,984,339 which includes the differential tapered profile that results in the setting of the yield point of the hook and permits flexing of the hook during disengagement of the hook from a loop. The combination of the special molded hook shape with small displacement volumes, as will be described in more detail below, provides a novel and especially valuable hook fastener for engaging with low profile loops.

Figure 7:
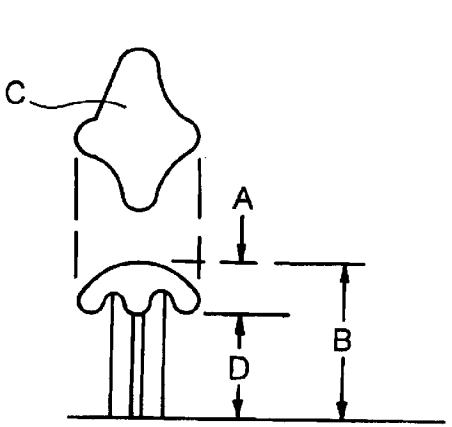
PRIOR ART FIG. 7
FIG. 7 is the cross section of a mushroom hook showing the profile of displacement.
Figure 9:
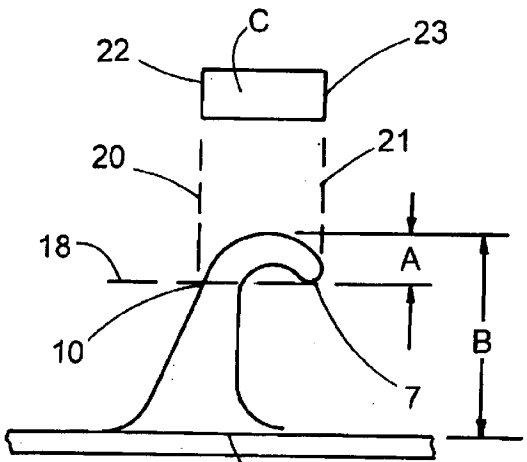
FIG. 9 is a cross sectional profile of a hook shape of the present invention and shows the profile of displacement for that hook.
Figure 8:
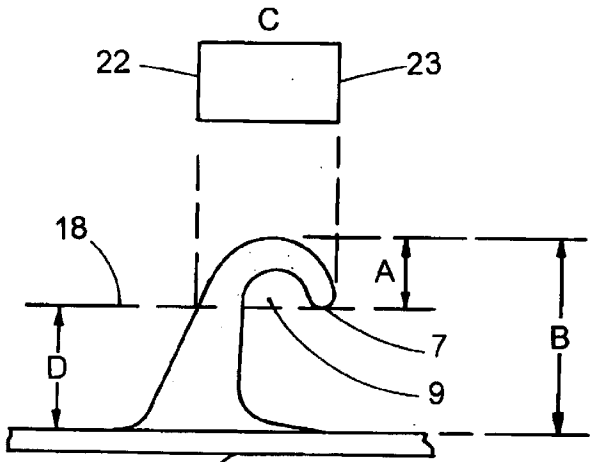
FIG. 8 depicts the hook of FIG. 4 showing the profile of displacement.
Figure 10:
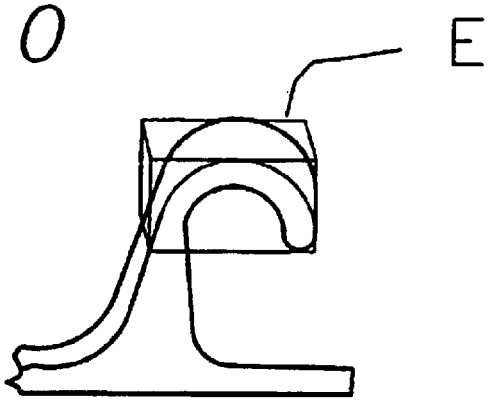
FIG. 10 is the cross section of the hook of the present invention showing the profile of displacement.
Figure 11:
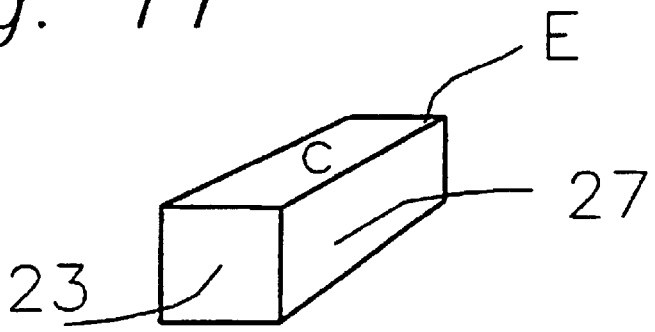
FIG. 11 is a three dimensional illustration of the parallelepiped which is defined as the displacement volume.

Now turning to FIGS. 6 through 8. As explained above, dimension "A" represents the height of the crook and it is essential the hook penetrate into the mat of loops to a depth at least greater than the height of the crook so that tip (7) will rest below the tops of loops and the loops can spring into the space(9) and be ensnared by the hook. If this does not happen there can be no engagement. The area of loops that must be displaced when the hook penetrates into loops to this point is depicted by the rectangle "C" in each of FIGS. 6, 7, 8, and 9. Rectangle "C" is the cross section of the hook along a plane cut through the hook parallel to the base and tangent to the point on the hook tip that is nearest the base. For example, in FIG. 8 the plane is depicted by dashed line (18) which rests parallel to the base (15), is displaced from the top of the hook by dimension "A" and displaced from the base (15) by dimension "D". It can be readily seen that dimension "D" is equal to "B"–"A". The area of rectangle "C" for any hook will be influenced by several factors. Looking to FIG. 9, the plane(18) cuts through the hook such that the plane is parallel to the base (15), upon which the hook foundation rests, and intersects the back side of the hook at the point(10). Line 20 projects perpendicular to the intersecting plane(18) and because plane (18) is parallel to the base(15), line (20) is also perpendicular to the base(15). If a second line (21) is drawn perpendicular to the plane(18) and also tangent to the outermost edge of the hook tip(7), line (21) will be parallel to line (20). The lines described define the terminal ends of rectangle "C" (22) and (23). "C" represents the area displaced by the hook in penetrating the mat of loops, or put another way the area to which loops must be pushed aside or displaced for penetration to take place. If the loops into which the hooks penetrate are very resilient, they will immediately bend around such a plane and close in behind the face of the plane. However, if the hook is a solid mass, as in fact it is, the loops simply push back against the walls of the hook. The penetrating hooks have in reality a volume and this volume can simply be defined as the volume of a parallelepiped encasing the crook portion of the hook above the point where penetration is sufficient to enable engagement. FIG. 10 shows the position of the parallelepiped "E" relative to the entire hook configuration. FIG. 11 shows the parallelepiped standing alone. The volume of the parallelepiped can be calculated for a single hook by taking the area "C" and multiplying by the height of the crook "A" where "E"="A"×"C". We have defined this volume as "displacement volume".

We have found this displacement volume is an important factor in determining the ability of a hook to engage with certain types of loops. When the loop height is very low, hooks of low displacement volume show markedly improved performance even though there is more than simple loop height to contend with when determining the ability of a loop to accept a given hook.

The following table shows displacement volume values for a variety of hook types sold by Velcro USA Inc., the assignee of the instant application.

| HOOK TYPE | DISPLACEMENT VOLUME | SHEAR IN LOW LOOP |
|---|---|---|
| Standard Tensile | $6.0 \times 10^{-6}$ | 6.5–10.0 |
| Ultra-Mate 15 style | $7.4 \times 10^{-6}$ | 3.0–8.0 |
| Molded 8 style | $14 \times 10^{-6}$ | 4.0–9.0 |
| Ultra-Mate 24 style | $14 \times 10^{-4}$ | 8.0–13.0 |
| Standard Mushroom | $1.4 \times 10^{-4}$ | 15.0–20.0 |
| Molded 22 style | $1.1 \times 10^{-4}$ | 22.0–29.0 |

Figure 12:
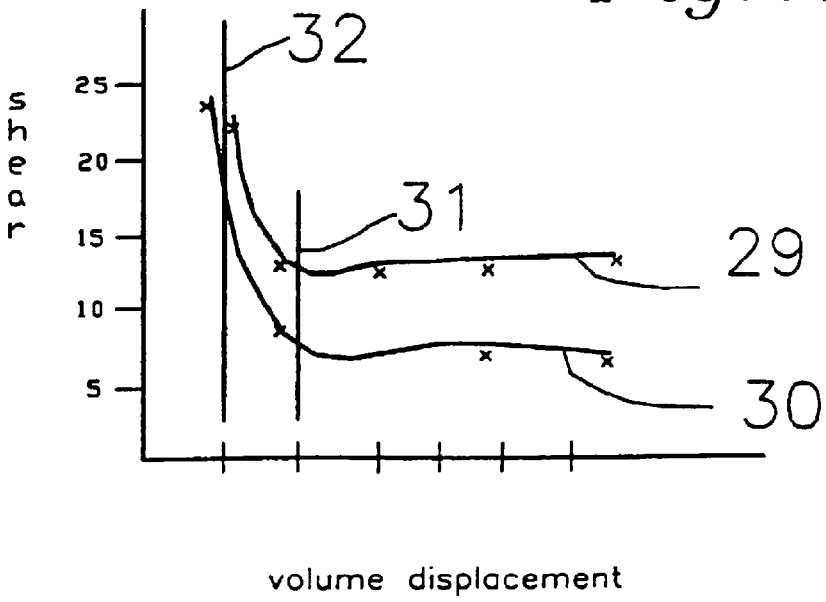
FIG. 12 is a graph depicting the relationship between shear strength and hook displacement volume for a low profile loop.

FIG. 12 is a graph depicting the relationship of shear strength of hooks to displacement volumes for hooks engaged in a low profile loop closure system, loop style #3610 sold by Velcro USA Inc. and having loop height of approximately 0.040 inches. This is a fraction of standard loops such as loop 1000 sold by Velcro USA Inc. which has a loop height of approximately 0.100 inches. Data for the graph is taken from the table above to create the plot shown in FIG. 12. The ordinate of the graph of FIG. 12 shows shear strength measured as the strength per square inch of closure. The abscissa shows displacement volume ranging from $1.1\times10^{-6}$ to $24\times10^{-6}$ cubic inches. It is clear from this graph that displacement volume dramatically influences the ability of a hook to perform in the shear mode for this loop design. The shear starts to increase at $6\times10^{-6}$ and rapidly rises to almost double at $4\times10^{-6}$. For engaging into short fine loops a hook having a displacement volume of less than $6\times10^{-6}$ is desirable but preferably the displacement volume will be less than $4\times10^{-6}$.

These indicators can be very useful in designing new hook shapes for specific loop geometries. However, hook displacement volume is by no means the only measure to be used in evaluating the ease of engagement of a hook in a low profile loop even though it is one of the important factors. As explained earlier the height of the crook itself influences the displacement volume of any particular hook, but in addition, the thickness of the hook has a great effect on the displacement volume. In addition, the general shape of the hook can have a major effect on the displacement volume. The hook shape of U.S. Pat. No. 4,984,339 is especially well suited for engagement with low profile loops and the molding process for making that hook is easily adjusted to achieve the modification of the displacement volume and to produce hooks in the preferred range of displacement as disclosed herein. For example, in FIG. 9 the location of the point(10) where the back side of the hook intercepts the lower plane defining the displacement volume sets the dimension of the footprint "C". If the hook has a very shallow rearward slope the point of intersection(10) will be moved rearward also and the displacement volume will be increased. At the crook tip the placement of the hook tip sets the relative position of this same lower plane and the shorter the crook height the lower the displacement volume. It will be appreciated the displacement volume may be adjusted by altering many of the dimensions of the hook shape. Such adjustment is easily accomplished by the methods disclosed in U.S. Pat. No. 4,794,028.

Heretofore this influence of displacement volume on hook and loop performance has not been understood. Hook design has been a matter of trial and error with little rhyme or reason. Hook selection has been primarily a matter of using the materials available and little effort has gone into designing hooks with the specific geometry to accomplish a specific type of performance. It has been known that using a thicker monofilament would result in greater tape separation forces than would be the case if finer monofilaments were used. The development of mushroom tapes and the size of the head is merely a matter of accident. The head was not designed with any specific shape or size intended.

Understanding of the principles of the engagement problem in fine low profile loops has provided the clue to the development of advanced hook products. I have found that plastic molded hooks with a displacement volume of less than about $6\times10^{-6}$, and preferably less than $4\times10^{-6}$, engage especially well in loops with a pile height of less than 0.025 inches. Such fine molded hooks have never before been produced. Development of such hooks is a considerable advance in the art, and for the first time, this understanding permits development of hook tapes which are specifically designed for the very desirable aesthetic and cost effective low profile loops.

I claim:

[1. A hook for a hook and loop fastening system comprising:

a base;

a stem connected at its lower end to the base, the stem having an outer side and an inner side;

a crook having a first end and a hook tip, the first end connected to the stem, the crook projecting upwards from the stem and then downwards towards the base in a substantially smooth curve ending at the hook tip;

the hook having a width, a height, and a displacement volume, wherein displacement volume is the volume of a rectangular parallelepiped having a bottom plane, first and second side planes, first and second end planes and a top plane; the bottom plane orientated parallel to the base and tangent to the hook tip, the top plane parallel to the base and tangent to the top of the hook at the point where the crook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip;

wherein the displacement volume of the hook is less than $6\times10^{-6}$ cubic inches ($9.83\times10^{-5}$ cc).]

[2. The hook of claim 1 wherein the crook height is less than 0.012 inches.]

[3. The hook of claim 1 wherein the thickness of the hook is less than 0.010 inches.]

[4. The hook of claim 1 wherein the footprint of the hook is less than $1.5\times10^{-4}$ square inches.]

[5. A hook for a hook and loop fastening system comprising:

a base;

a stem connected at its lower end to the base, the stem having an outer side and inner side;

a crook having a first end and a hook tip, the first end connected to the stem, and then downwards towards the base in a substantially smooth curve ending at the hook tip;

the hook having a width, a height and a displacement volume, wherein displacement volume is the volume of a rectangular parallelepiped having a bottom plane, first and second side planes, first and second end planes and a top plane; the bottom plane orientated parallel to the base and tangent to the hook tip, the top plane parallel to the base and tangent to the top of the hook at the point where the crook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip;

wherein the displacement volume of the hook is less than $4\times10^{-6}$ cubic inches.]

[6. The hook of claim 5 wherein the crook height is less than 0.012 inches.]

[7. The hook of claim 5 wherein the thickness of the hook is less than 0.010 inches.]

[8. The hook of claim 5 wherein the footprint of the hook is less than $1.5\times10^{-4}$ square inches.]

9. In a hook for a hook and loop fastener having a profile defined by an inner generally concave face and an outer generally convex face, the hook comprising a planar base member intimately engaging a tapered base portion and extending there from to join, in a transition region, a tapered hook portion able to engage a loop applying a force to the hook portion substantially normal to the planar base member and terminating in a free end, the taper of the hook portion being much less than the taper of the base portion wherein the hook tapers continuously downwardly in width from the tapered base portion to the free end such that a loop engaging the hook in tension, with the force being substantially normal to the planar base member, will cause the hinging or buckling of the hook at a location adjacent the outer face in the transition region as the hook deforms under the applied force and such that a loop engaging the hook in shear, with the force substantially parallel to the planar base member, will transmit bending force through the tapered base portion between the location of buckling and the planar base member, the hook being of substantially constant thickness and having a substantially rectangular traverse cross section and a displacement volume, wherein displacement volume is the volume of a rectangular parallelepiped having a bottom plane, first and second side planes, first and second end planes and a top plane; the bottom plane oriented parallel to the base and tangent to the hook tip, the top plane parallel to the base and tangent to the top of the hook at the point where the hook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip; wherein the volume displacement of the hook is less than $6\times10^{-6}$ cubic inches ($9.83\times10^{-5}$ cubic centimeters).

10. The hook according to claim 9 wherein the inner face in the transition region has an angle to the direction normal to the base member orientated to encourage a loop engaging the hook in shear to move toward the base member.

11. The hook according to claim 9 wherein the crook height of the hook is less than 0.012 inches.

12. The hook according to claim 9 wherein the inner generally concave face is so shaped as to encourage a loop engaging the hook in shear to engage the hook at about the location of buckling.

13. The hook portion of a hook and loop assembly comprising a multiplicity of hooks, having the configuration of the hook of claim 9 assembled into a multiplicity of hooks onto and extending from a common integral planar base.

14. The hook portion of a hook and loop assembly according to claim 13 wherein the multiplicity of hooks are aligned in a given direction so that adjacent rows of hooks face in opposite directions.

15. The hook portion of a hook and loop assembly according to claim 13 wherein the multiplicity of hooks are aligned in a given direction so that all hooks face in the same direction.

*16. A plastic hook product for a hook and loop fastening system having hooks sized and shaped to be capable of engaging loops of a loop product with a pile height of approximately 0.04 inches or less, the hook product comprising a multiplicity of plastic hooks in adjacent rows and extending from a common integral planar base, each of the multiplicity of hooks comprising:*

*a stem connected at its lower end to the base by being molded integrally with the base, the stem having an outer side and an inner side;*

*a crook having a first end and a hook tip, the first end connected to the stem, the crook projecting upwards from the stem and then downwards towards the base in a substantially smooth curve ending at the hook tip;*

*the hook having a width, a height, and a displacement volume, wherein displacement volume is the volume of a rectangular parallelepiped having a bottom plane, first and second side planes, first and second end planes and a top plane; the bottom plane orientated parallel to the base and tangent to the hook tip, the top plane parallel to the base and tangent to the top of the hook at the point where the crook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip;*

*wherein the displacement volume of the hook is less than $6\times10^{-6}$ cubic inches ($9.83\times10^{-5}$ cc).*

*17. In a plastic hook product for a hook and loop fastener, the hook product having a multiplicity of plastic hooks sized and shaped to be capable of engaging loops of a loop product with a pile height of approximately 0.04 inches or less, hooks of the multiplicity of hooks each having a profile defined by an inner generally concave face and an outer generally convex face, the hooks of the multiplicity of hooks each comprising a planar base member intimately engaging a tapered base portion, by being molded therewith, and extending there from to join, in a transition region, a tapered hook portion able to engage a loop applying a force to the hook portion substantially normal to the planar base member and terminating in a free end, the taper of the hook portion being much less than the taper of the base portion wherein the hook tapers continuously downwardly in width from the tapered base portion to the free end such that a loop engaging the hook in tension, with the force being substantially normal to the planar base member, will cause the hinging or buckling of the hook at a location adjacent the outer face in the transition region as the hook deforms under the applied force and such that a loop engaging the hook in shear, with the force substantially parallel to the planar base*

*member, will transmit bending force through the tapered base portion between the location of buckling and the planar base member, the hook being of substantially constant thickness and having a substantially rectangular traverse cross section and a displacement volume, wherein displacement volume is the volume of a rectangular parallelepiped having a bottom plane, first and second side planes, first and second end plates and a top plane; the bottom plane oriented parallel to the base and tangent to the hook tip, the top plane parallel to the base and tangent to the top of the hook at the point where the hook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip; wherein the volume displacement of the hook is less than $6\times10^{-6}$ cubic inches ($9.83\times10^{-5}$ cubic centimeters),*

*the multiplicity of plastic hooks being in adjacent rows, a common integral planar base of said hook product being formed by base members of all of the multiplicity of plastic hooks.*

*18. The hook product of claim 17 wherein the inner face of the transition region has an angle to the direction normal to the base member oriented to encourage a loop engaging the hook to move toward the base member.*

*19. The hook product of claim 17 wherein the inner generally concave face is so shaped as to encourage a loop engaging the hook in shear to engage the hook at about the location of buckling.*

*20. A plastic hook product for a hook and loop fastening system having hooks sized and shaped to be capable of engaging loops of a loop product with a pile height of approximately 0.04 inches or less, the hook product comprising a multiplicity of plastic hooks in adjacent rows facing in opposite directions and extending from a common integral planar base, each of the multiplicity of hooks comprising:*

*a stem connected at its lower end to the base by being molded integrally with the base, the stem having an outer side and an inner side;*

*a crook having a first end and a hook tip, the first end connected to the stem, the crook projecting upwards from the stem and then downwards towards the base in a substantially smooth curve ending at the hook tip;*

*the hook having a width, a height, and a displacement volume, wherein displacement volume is the volume of a rectangular parallelepiped having a bottom plane, first and second side planes, first and second end planes and a top plane; the bottom plane orientated parallel to the base and tangent to the hook tip, the top plane parallel to the base and tangent to the top of the hook at the point where the crook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip;*

*wherein the displacement volume of the hook is less than $6\times10^{-6}$ cubic inches ($9.83\times10^{-5}$ cc).*

*21. A plastic hook product for a hook and loop fastening system having hooks sized and shaped to be capable of engaging loops of a loop product with a pile height of approximately 0.04 inches or less, the hook product comprising a multiplicity of plastic hooks in adjacent rows and extending from a common integral planar base, each of the multiplicity of hooks comprising:*

*a stem connected at its lower end to the base by being molded integrally with the base, the stem having an outer side and an inner side;*

*a crook having a first end and a hook tip, the first end connected to the stem, the crook projecting upwards from the stem and then downwards towards the base in a substantially smooth curve ending at the hook tip;*

*the hook having a width, a height, and a displacement volume, wherein displacement volume is the volume of a rectangular parallelepiped having a bottom plane, first and second side planes, first and second end planes and a top plane; the bottom plane orientated parallel to the base and tangent to the hook tip, the top plane parallel to the base and tangent to the top of the hook at the point where the crook achieves its maximum distance from the base, the side planes laying in the plane of the sides of the hook; the first end plane perpendicular to the bottom plane at the point where the bottom plane intersects the stem at its outer side, the second end plane perpendicular to the bottom plane and tangent to the outermost portion of the hook tip;*

*wherein the displacement volume of the hook is less than $6\times10^{-6}$ cubic inches ($9.83\times10^{-5}$ cc), the hook product being produced by the method comprising:*

*integrally molding the base and hooks using a molding roller having open-ended but otherwise closed hook-shaped mold cavities in its periphery, including filling the mold cavities with the base in contact with the periphery, and*

*pulling the base progressively away from the periphery of the molding roller and progressively pulling the hooks longitudinally from the mold cavities.*

*22. The hook product of any of claims 16, 18 or 21 wherein the displacement volume is less than $4\times10^{-6}$ cubic inches.*

*23. The hook product of any of claims 16, 18 or 21 wherein for each hook the crook height is less than 0.012 inches.*

*24. The hook product of any of claims 16, 18 or 21 wherein for each hook the thickness of the hook is less than 0.010 inches.*

*25. The hook product of any of claims 16, 18 or 21 wherein the footprint of each hook is less than $1.5\times10^{-4}$ square inches.*

*26. The hook product of any of claims 16, 20 or 21 wherein the multiplicity of hooks face in the same direction.*

*27. The hook product of any of claims 16, 20 or 21 wherein the hooks have differing orientations to provide multidirectional shear operation.*

*28. The hook product of claim 21, wherein the method of producing the hook product further comprises, prior to pulling, cooling each of the hooks sufficiently to retain its shape without the aid of its mold cavity and to be sufficiently resilient to return to its desired shape after being pulled longitudinally from its mold cavity while still being flexible enough to permit such removal without destructive stresses being reached in the hooks.*

*29. The hook product of claim 21, each hook being tapered and including concave fillets where the stem is connected to the base, the taper and the concave fillets coupled with the generally arcuate shape of the crook portion providing removal easing clearances facilitating the removal of the hook from its mold cavity by pulling longitudinally from its mold cavity.*

* * * * *